US009046130B2

(12) United States Patent
Kachinski

(10) Patent No.: US 9,046,130 B2
(45) Date of Patent: Jun. 2, 2015

(54) GAS TURBINE ENGINE AND HIGH SPEED ROLLING ELEMENT BEARING

(75) Inventor: Paul A. Kachinski, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1140 days.

(21) Appl. No.: 12/981,010

(22) Filed: Dec. 29, 2010

(65) Prior Publication Data

US 2012/0111024 A1 May 10, 2012

Related U.S. Application Data

(60) Provisional application No. 61/290,834, filed on Dec. 29, 2009.

(51) Int. Cl.
| | |
|---|---|
| F16C 25/08 | (2006.01) |
| F16C 19/16 | (2006.01) |
| F16C 19/54 | (2006.01) |
| F01D 25/16 | (2006.01) |

(52) U.S. Cl.
CPC ............ *F16C 25/083* (2013.01); *F01D 25/162* (2013.01); *F16C 2360/23* (2013.01); *F05D 2240/52* (2013.01); *F16C 19/163* (2013.01); *F16C 19/546* (2013.01)

(58) Field of Classification Search
CPC .... F16C 25/083; F16C 19/163; F16C 19/183; F16C 19/546; F16C 2360/23; F05D 2240/52; F05D 2240/50; F01D 25/162

USPC ......... 384/517, 518, 504, 609, 611, 615, 616, 384/470, 512–513, 523, 572–573, 614, 384/623; 60/805

See application file for complete search history.

(56) References Cited

U.S. PATENT DOCUMENTS

| | | | |
|---|---|---|---|
| 3,158,415 A | 11/1964 | Gardner | |
| 3,712,693 A | 1/1973 | Root et al. | |
| 3,734,581 A | 5/1973 | LeBreton | |
| 3,738,719 A * | 6/1973 | Langner | ........................ 384/517 |
| 3,894,818 A | 7/1975 | Tschirky | |
| 3,900,232 A * | 8/1975 | Rode | ............................ 384/517 |
| 3,982,797 A | 9/1976 | Tschirky et al. | |
| 4,042,284 A | 8/1977 | Coster | |
| 4,323,285 A | 4/1982 | Gilson | |
| 4,493,514 A | 1/1985 | Henry, IV | |
| 4,523,864 A | 6/1985 | Walter et al. | |
| 4,676,667 A * | 6/1987 | Komatsu et al. | ................ 384/99 |
| 4,856,914 A | 8/1989 | Sigg | |
| 4,906,110 A | 3/1990 | Van Wyk et al. | |
| 5,316,393 A * | 5/1994 | Daugherty | .................... 384/517 |

(Continued)

OTHER PUBLICATIONS

International Search Report and Written Opinion, PCT/US2010/062358, Nov. 29, 2011, Rolls-Royce Corporation.

*Primary Examiner* — Phutthiwat Wongwian
*Assistant Examiner* — Carlos A Rivera
(74) *Attorney, Agent, or Firm* — Krieg DeVault LLP

(57) ABSTRACT

One embodiment of the present invention is a unique gas turbine engine. Another embodiment is a unique gas turbine engine high speed rolling element bearing system. Other embodiments include apparatuses, systems, devices, hardware, methods, and combinations for gas turbine engines and high speed rolling element bearing systems for gas turbine engines. Further embodiments, forms, features, aspects, benefits, and advantages of the present application shall become apparent from the description and figures provided herewith.

18 Claims, 2 Drawing Sheets

(56) References Cited

U.S. PATENT DOCUMENTS

| | | | |
|---|---|---|---|
| 5,522,667 A * | 6/1996 | Miyake | 384/492 |
| 5,667,314 A | 9/1997 | Limanowka et al. | |
| 5,741,116 A | 4/1998 | Hudson | |
| 6,048,101 A * | 4/2000 | Rasmussen | 384/616 |
| 6,082,959 A * | 7/2000 | Van Duyn | 415/9 |
| 6,123,462 A | 9/2000 | Crowell | |
| 6,394,658 B1 | 5/2002 | Crowell | |
| 6,561,697 B2 | 5/2003 | Tsui | |
| 6,799,895 B2 | 10/2004 | Reynolds | |
| 8,439,637 B2 * | 5/2013 | DiBenedetto et al. | 415/229 |
| 2008/0087018 A1 | 4/2008 | Woollenweber | |
| 2009/0293445 A1 * | 12/2009 | Ress, Jr. | 60/39.15 |

* cited by examiner

GAS TURBINE ENGINE AND HIGH SPEED ROLLING ELEMENT BEARING

CROSS REFERENCE TO RELATED APPLICATIONS

The present application claims the benefit of U.S. Provisional Patent Application 61/290,834, filed Dec. 29, 2009, and is incorporated herein by reference.

FIELD OF THE INVENTION

The present invention relates to gas turbine engines, and more particularly, to a high speed rolling element bearing system for a gas turbine engine.

BACKGROUND

Gas turbine engines and high speed rolling element bearing systems for gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique gas turbine engine high speed rolling element bearing system. Other embodiments include apparatuses, systems, devices, hardware, methods, and combinations for gas turbine engines and high speed rolling element bearing systems for gas turbine engines. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
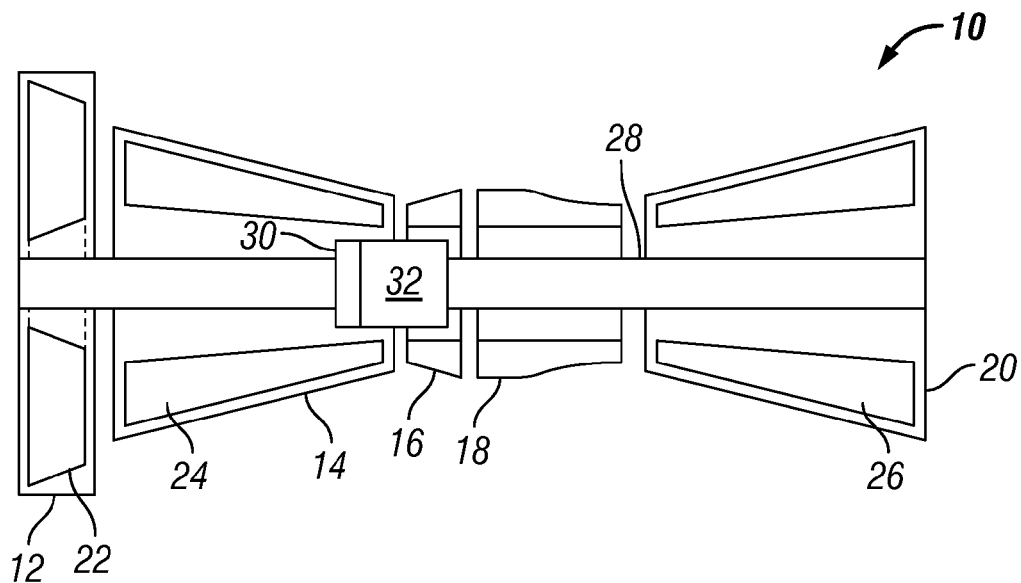
FIG. 1 schematically illustrates a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, an in particular FIG. 1, a non-limiting example of a gas turbine engine 10 in accordance with an embodiment of the present invention is depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may be a single or multi-spool turbofan, turboshaft, turbojet, turboprop gas turbine or combined cycle engine.

Gas turbine engine 10 includes a fan system 12, a compressor system 14, a diffuser 16, a combustion system 18 and a turbine system 20. Combustion system 18 is fluidly disposed between compressor system 14 and turbine system 20. Fan system 12 includes a fan rotor system 22. Compressor system 14 includes a compressor rotor system 24. Turbine system 20 includes a turbine rotor system 26. Turbine rotor system 26 is drivingly coupled to compressor rotor system 24 and fan rotor system 22 via a shafting system 28. Coupled to shafting system 28 is a high speed rolling element bearing system 30 that is operative to react varying and intermittent thrust loads.

In various embodiments, fan rotor system 22, compressor rotor system 24 and turbine rotor system 26 each include one or more rotors. In one form, each expansion rotor is drivingly coupled to a corresponding compression rotor via a separate main shaft of shafting system 28, forming a spool of engine 10.

Figure 2:
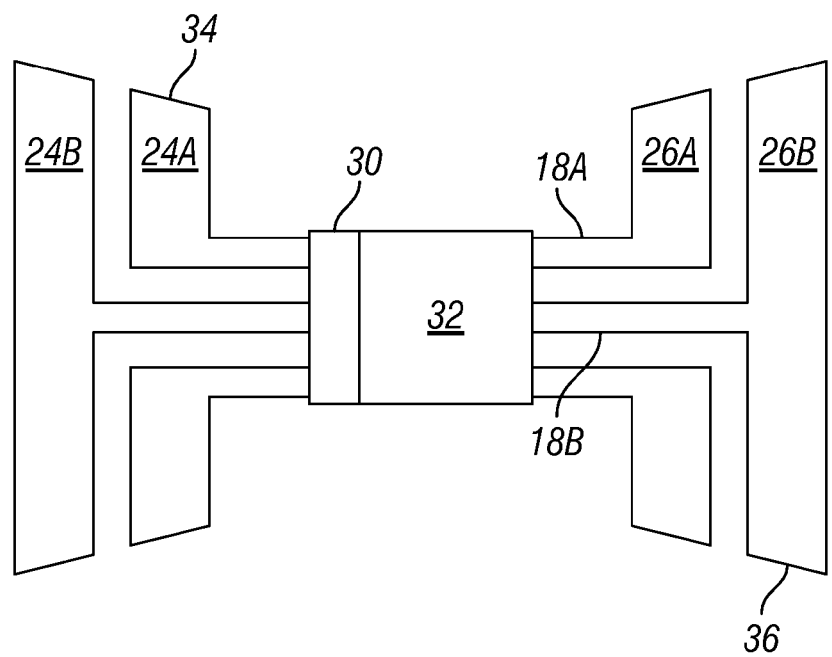
FIG. 2 schematically illustrates aspects of the gas turbine engine of FIG. 1.

Referring now to FIG. 2, in one form, engine 10 includes a spool 34 and a spool 36. Spool 34 is formed of a compressor rotor 24A coupled to a turbine rotor 26A via a shaft 18A. Spool 36 is formed of a compressor rotor 24B coupled to a turbine rotor 26B via a shaft 18B. In one form, spool 34 and spool 36 may be selectively coupled to each other by dutch system 32, which is controlled by means not shown. In other embodiments, dutch system 32 may selectively couple other gas turbine engine rotors, e.g., including one or more fan 12 rotors. In various embodiments, dutch system 32 may be any rotating dutch in a gas turbine engine. In one form, bearing system 30 reacts thrust loads from dutch system 32. In other embodiments, bearing system 30 may react other intermittent and/or varying thrust loads.

During the operation of gas turbine engine 10, air is drawn into the inlet of fan 12 and pressurized by fan 12. Some of the air pressurized by fan 12 is directed into compressor system 14, and the balance is directed into a bypass duct (not shown). Compressor system 14 further pressurizes the air received from fan 12, which is then discharged into diffuser 16. Diffuser 16 reduces the velocity of the pressurized air, and directs the diffused airflow is into combustion system 18. Fuel is mixed with the air in combustion system 18, which is then combusted in a combustion system 18 combustion liner (not shown). The hot gases exiting combustor 18 are directed into turbine system 20, which extracts energy in the form of mechanical shaft power to drive fan system 12 and compressor system 14 via shafting system 28. The hot gases exiting turbine system 20 are directed into a nozzle (not shown), and provide a component of the thrust output by gas turbine engine 10.

At some engine 10 operating points, it is desirable to couple spool 34 with spool 36, whereas at other engine 10 operating points, it is desirable that spool 34 and spool 36 are decoupled. Coupling is performed using clutch system 32, with the primary thrust loads from the clutching operation being reacted by bearing system 30. Upon completion of the clutching operation, the primary thrust load is removed from bearing system 30.

When the thrust load carrying capacity of a single ball bearing is inadequate, it becomes necessary to use two or more bearings in tandem to share the load. Also, in some applications, tandem mounted bearings may be desirable for use in place of a single ball bearing at lower thrust loads where size is a concern—tandem mounted bearings are often able to carry the same load with a more compact physical size of the bearings, e.g., a smaller diameter. Tandem mounted thrust bearings are thrust bearings modified in a manner that allows for load-sharing between each of the tandem mounted bearings, e.g., equal load sharing. However, tandem mounted bearings can only carry thrust in one direction, and do not do well when the axial load is removed. Although it may be possible to employ one or more additional bearings that are adjusted against the tandem mounted bearings to carry the axial loads acting contrary to the tandem design thrust direction, such a solution results in an otherwise unnecessary bearing, which adds weight, cost and potential reliability concerns to the bearing system and the engine.

In order to overcome problems associated with loss of the thrust load, embodiments of the present invention include a preload generating device that applies an axial preload thrust load to tandem mounted thrust bearings in a manner that allows for continued operation during thrust load reversal and/or when the thrust load is no longer acting on the pair of bearings. The thrust preload is applied between the bearings, and does not require the use of additional bearings to address thrust loads acting contrary to the tandem bearing set's design direction. Embodiments of the present invention are similarly applicable to two-thrust-bearing systems as well as bearing systems having more than two thrust bearings.

Figure 3:
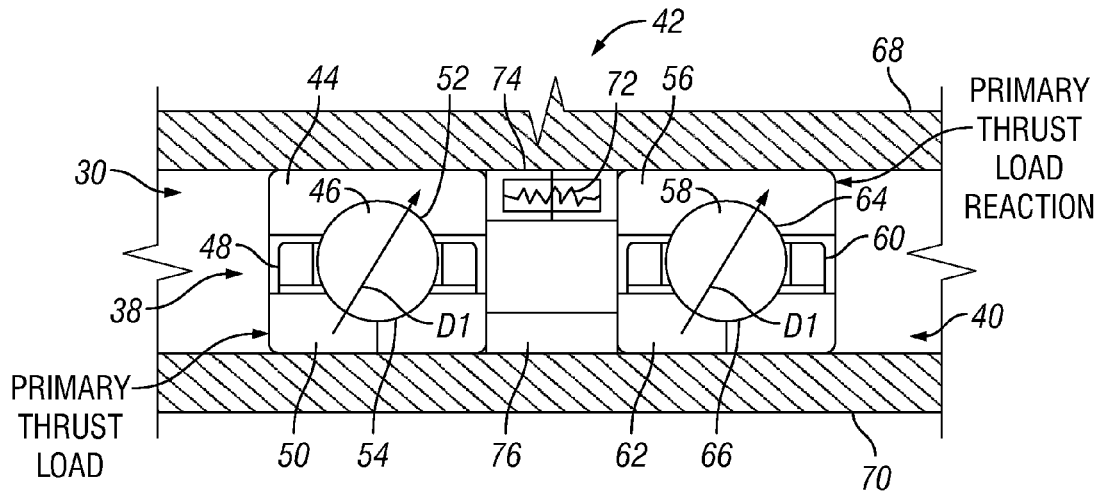
FIG. 3 schematically illustrates a gas turbine engine bearing system in a first operating state in accordance with an embodiment of the present invention.
Figure 4:
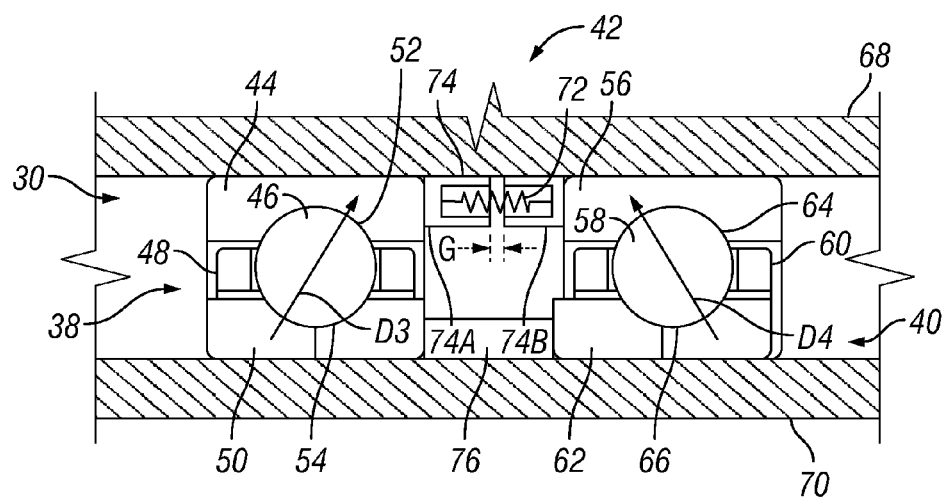
FIG. 4 schematically illustrates a gas turbine engine bearing system in a second operating state in accordance with an embodiment of the present invention.

Referring now to FIGS. 3 and 4, aspects of a non-limiting example of high speed rolling element bearing system 30 in accordance with an embodiment of the present invention are depicted. High speed rolling element bearing system 30 includes a tandem mounted high speed rolling element thrust bearing 38 and high speed rolling element thrust bearing 40, and also includes a preload generator 42. In one form, the thrust bearings are ball thrust bearings. In other embodiments, other high speed rolling element thrust bearings may be employed. Bearings 38 and 40 may be made from materials known in the art that are typical for gas turbine engine applications.

Bearing 38 includes an outer ring 44, a plurality of balls 46, a separator 48 and an inner ring 50. Outer ring 44 includes an outer ring ball groove 52. In one form, outer ring 44, which may be referred to as an outer race, is a single-piece ring. In other embodiments, outer ring 44 may be a multi-piece ring, such as a split outer ring. Inner ring 50 includes an inner ring ball groove 54. In one form, inner ring 50, which may be referred to as an inner race, is a split inner ring. In other embodiments, inner ring 50 may be a single-piece ring. Balls 46 are disposed in grooves 52 and 54 between outer ring 44 and inner ring 50. Separator 48 is disposed between outer ring 44 and inner ring 50. In one form, separator 50 is an outer ring piloted separator. Other embodiments may employ other separator piloting schemes, e.g., may employ an inner ring piloted separator. Separator 48 is operative to separate each ball 46 from adjacent balls 46. In one form, bearing 38 is operative to react and transfer radial and thrust loads between inner ring 50 and outer ring 44. In other embodiments, bearing 40 may be structured to transmit only or predominantly only thrust loads.

Bearing 40 includes an outer ring 56, a plurality of balls 58, a separator 60 and an inner ring 62. Outer ring 56 includes an outer ring ball groove 64. In one form, outer ring 56, which may be referred to as an outer race, is a single-piece ring. In other embodiments, outer ring 56 may be a multi-piece ring, such as a split outer ring. Inner ring 62 includes a inner ring ball groove 66. In one form, inner ring 62, which may be referred to as an inner race, is a split inner ring. In other embodiments, inner ring 62 may be a single-piece ring. Balls 58 are disposed in grooves 64 and 66 between outer ring 56 and inner ring 62. Separator 60 is disposed between outer ring 56 and inner ring 62. In one form, separator 60 is an outer ring piloted separator. Other embodiments may employ other separator piloting schemes, e.g., may employ an inner ring piloted separator. Separator 60 is operative to separate each ball 58 from adjacent balls 58. In one form, bearing 40 is operative to react and transfer radial and thrust loads between inner ring 62 and outer ring 56. In other embodiments, bearing 40 may be structured to transmit only or predominantly only thrust loads.

In one form, outer rings 44 and 56 are mounted in a static bearing housing 68, and inner rings 50 and 62 are mounted on a rotating shaft 70. Other rotating and/or static structures (not shown) may be positioned adjacent to outer rings 44 and 56 and inner rings 50 and 62, e.g., to transmit loads through one or both of bearings 38 and 40 and/or to position one or both of bearings 38 and 40 in radial, circumferential and/or axial directions. In the depicted embodiment, the primary thrust load is applied against inner ring 50 and against inner ring 62; and the primary thrust load reaction is applied against outer ring 56 and against outer ring 44, that is, the primary thrust load is reacted through outer ring 56 and outer ring 44. In other embodiments, high speed rolling element bearing system 30 may be configured for other loading schemes. Also, in other embodiments, inner rings 50 and 62 may mounted in a static bearing housing 68, and outer rings 44 and 56 may be mounted on a shaft 70. In still other embodiments, outer rings 44 and 56 may be mounted on a rotating structure, e.g., a first shaft, and inner rings 50 and 62 may be mounted on another rotating structure, e.g., a second shaft that rotates in the same or opposite direction as the first shaft.

Preload generator 42 is operative to generate a preload in the form of a thrust load between the bearing 38 and bearing 40 upon removal of the primary thrust load that is externally generated and applied to bearings 38 and 40 (that is, generated externally of bearings 38 and 40, which in the present non-limiting example is a clutch system 32 thrust load). In particular, preload generator 42 is configured to generate a thrust load that loads bearing 38 against bearing 40 upon the removal of the primary thrust load or the reduction of the primary thrust load to a level less than the thrust exerted by preload generator 42. By loading bearing 38 against bearing 40, both bearings 38 and 40 are loaded in thrust, which promotes operational stability and increased life of the bearings, as compared to tandem mounted high speed ball thrust bearings that that are operated in the absence of a thrust load or operated at a thrust load that is substantially lower than the design thrust load or design thrust load range.

In one form, preload generator 42 is disposed between outer ring 44 and outer ring 56, and is operative to axially translate one or both of outer rings 44 and 56 to increase the distance between them upon the removal or reduction of the primary thrust load as set forth above. In other embodiments, preload generator 42 may be positioned in other locations, and may be operative to increase or decrease the axial distance between outer rings 44 and 56 upon the removal of the primary thrust load. In still other embodiments, preload generator 42 may be configured to increase or decrease the axial distance between inner rings 50 and 62 upon the removal or reduction of the primary thrust load as set forth above, and to provide a thrust load between inner rings 50 and 62 to load bearing 38 against bearing 40. In still other embodiments, preload generator 42 may be configured to increase and/or decrease the axial distance between outer rings 44 and 56 and between inner rings 50 and 62 upon the removal or reduction of the primary thrust load as set forth above, and to provide a thrust load between inner rings 50 and 62 and between outer rings 44 and 56 to load bearing 38 against bearing 40.

In one form, preload generator 42 operates in a collapsed state when the primary thrust load is present, and operates in an expanded state when the primary thrust load is removed or reduced to being less than the thrust load exerted by preload generator 42. In the collapsed state, preload generator 42 controls the spacing between both of the outer rings or both of the inner rings so that bearings 38 and 40 react the primary thrust load in parallel. That is, so that bearings 38 and 40 share the primary thrust load, in which case the cross-corner loading direction in bearings 38 and 40 have an axial component in the same direction, which is left-to-right in the depicted example of FIG. 3, and indicated as cross-corner loading direction D1. The actual cross-corner loading direction varies with the degree of load sharing as between bearings 38 and 40 when reacting the primary thrust load. The use of the term, "parallel" refers to both bearings 38 and 40 being used to react the load, but does not refer to the degree of load sharing as between bearings 38 and 40.

In the expanded state, preload generator 42 generates a thrust preload that loads bearing 38 against bearing 40, which results in a cross-corner loading direction in bearing 38 being opposite that of bearing 40, i.e., having axial components with opposite directions. In the example of FIG. 4, preload generator 42 loads bearing 38 against bearing 40, which results in bearing 40 having a cross-corner loading direction axial component in the right-to-left direction, which is opposite the left-to-right direction of the axial component of the cross-corner loading of bearing 38. The cross-corner loading direction D4 of bearing 40 is seen in FIG. 4 as being opposite the cross-corner loading direction D3 of bearing 38 as a result of loading bearing 38 against bearing 40.

In the illustrated embodiment, preload generator 42 controls the spacing between outer rings 44 and 56 when in the collapsed state. The load sharing percentage in one form is approximately equal loading on bearing 38 and bearing 40, i.e., 50% of the primary thrust load is reacted by each of bearing 38 and bearing 40. In other embodiments, other load sharing distributions may be employed. Also, in other embodiments, preload generator 42 may be configured to control the spacing between bearing 38 and bearing 40 in an expanded state, and may load bearing 38 against bearing 40 in the collapsed state.

In one form, preload generator 42 includes a plurality of compression devices in the form of springs 72 disposed between outer ring 44 and outer ring 56 in a spacer 74. In other embodiments, only a single compression device may be employed, e.g., a wave spring, a bellows or a coil spring. In one form, spacer 74 is a split spacer. In other embodiments, spacer 74 may not be a split spacer. In one form, spacer 74 is formed separately from bearings 38 and 40. In other embodiments, spacer 74 may be integral with one or both of bearings 38 and 40, e.g., integral with one or both of outer rings 44 and 56 or integral with one or both of inner rings 50 and 62. Spacer 74 axial positions outer rings 44 and 56 with respect to each other by a desired amount. A spacer 76 between inner rings 50 and 62 is employed to space inner ring 50 apart from inner ring 62 by a desired amount.

In one form, the axial spacing between outer rings 44 and 56, and the axial spacing between inner rings 50 and 62 are selected to cause bearing 38 and bearing 40 to share the primary thrust load when preload generator 42 is in the collapsed state, and to determine the percentage load sharing of the primary thrust load. More particularly, the geometries of grooves 52 and 64 and their locations relative to each other, and the geometries of grooves 54 and 66 and their locations relative to each other are selected to cause bearing 38 and bearing 40 to share the primary thrust load when preload generator 42 is in the collapsed state, and to determine the percentage load sharing of the primary thrust load.

Springs 72 are configured to be overcome by the primary thrust load so that spacer 74 collapses (closes) upon the application of the primary thrust load, and controls the axial spacing between outer rings 44 and 56. Springs 72 are configured with a spring force that is overcome by the primary thrust load, so that upon the application of the primary thrust load, springs 72 compress, allowing spacer 74 to collapse under the primary thrust load. Springs 72 are also operative to generate a preload thrust between bearings 38 and 40 upon the removal or reduction of the primary thrust load as set forth above. When the primary thrust load is removed or reduced below the spring force of springs 72, springs 72 drive outer rings 44 and 56 apart, expanding spacer 74, and loading bearing 38 against bearing 40.

When the primary thrust load is removed, or is reduced to a level below the force exerted by springs 72, springs 72 displace outer rings 44 and 56 relative to each other, providing a preload thrust that loads bearing 38 against bearing 40. FIG. 3 illustrates an example of a collapsed state of preload generator 42, wherein both sides of spacer 74 are in contact with each other. FIG. 4 illustrates an example of an expanded state of preload generator 42, wherein there is a gap G between side 74A of spacer 74 and side 74B of spacer 74.

In one form, springs 72 are preload-generating devices in the form of coil springs. In other embodiments, other types of springs may be employed. In still other embodiments, other types of preload-generating devices may be employed, e.g., hydraulic pistons or diaphragms, etc., e.g., that are operated by engine lubrication oil pressure or fuel pressure; electromagnetic solenoids or electromagnets, etc. Although springs 72 are compressive devices, in other embodiments, tensile devices may be employed, e.g., extension springs, hydraulic pistons or diaphragms, etc., which may be positioned appropriately to generate preload.

During the operation of engine 10, the application of the primary thrust load collapses preload generator 42, and bearings 38 and 40 react the primary thrust load. Upon removal of the primary thrust load, or reduction of the primary thrust load to less than the thrust preload generated by preload generator 42, preload generator 42 expands, loading bearing 38 against bearing 40.

Embodiments of the present invention include a high speed rolling element bearing system for reacting a primary thrust load, comprising: a first high speed rolling element thrust bearing; a second high speed rolling element thrust bearing, wherein the first thrust bearing and the second thrust bearing are dimensionally configured to react the primary thrust load in parallel; and a preload generator operative to generate a thrust preload between the first bearing and the second bearing upon removal of the primary thrust load.

In a refinement, the first thrust bearing includes a first outer ring and a first inner ring; the second thrust bearing includes a second outer ring and a second inner ring; and the preload generator displaces one of the first outer ring and the first inner ring relative to a respective one of the second outer and the second inner ring.

In another refinement, the preload generator includes a spring operative to displace the one of the first outer ring and the first inner ring.

In yet another refinement, the spring is a coil spring.

In still another refinement, the high speed rolling element bearing system further comprises a spacer that axially positions the one of the first outer ring and the first inner ring relative to the respective one of the second outer and the second inner ring, wherein the coil spring is disposed within the spacer.

In yet still another refinement, the spacer is a split spacer having a first half and a second half, and wherein the action of the spring separates the first half from the second half.

In a further refinement, the first thrust bearing and the second thrust bearing have a cross-corner loading direction axial components that are in the same direction when the first thrust bearing and the second thrust bearing are reacting the primary thrust load and the primary thrust load is greater than the thrust preload; and wherein the cross-corner loading direction axial components are in opposite directions when the primary thrust load is less than the thrust preload.

In a yet further refinement, the first thrust bearing includes a first outer ring with a first outer ring groove, a first inner ring having a first inner ring groove, and a first plurality of rolling elements constrained within the first outer ring groove and the first inner ring groove and operative to transmit rotating loads between the first outer ring and the first inner ring; the second thrust bearing includes a second outer ring with a second outer ring groove, a second inner ring having a second inner ring groove, and a second plurality of rolling elements constrained within the second outer ring groove and the second inner ring groove and operative to transmit rotating loads between the second outer ring and the second inner ring; the first inner ring groove and the second inner ring groove are positioned in a fixed relationship to each other; and the preload generator displaces the first outer ring groove relative to the second outer ring groove upon the removal of the primary thrust load.

In a still further refinement, the first thrust bearing and the second thrust bearing are loaded against each other without the use of a third thrust bearing.

Embodiments of the present invention include a gas turbine engine, comprising: a compressor rotor system; a combustion system in fluid communication with the compressor rotor system; a turbine rotor system in fluid communication with the combustion system; and a high speed rolling element bearing system for reacting a primary thrust load, wherein the high speed rolling element bearing system is coupled to one or more components of one or both of the compressor rotor system and the turbine rotor system, and wherein the high speed rolling element bearing system includes: a first high speed rolling element thrust bearing; a second high speed rolling element thrust bearing, wherein the first thrust bearing and the second thrust bearing are dimensionally configured to react the primary thrust load in parallel; and wherein the bearing system further includes a preload generator operative to load the first bearing and the second bearing against each other upon removal of the primary thrust load.

In a refinement, the first thrust bearing includes a first outer ring and a first inner ring; the second thrust bearing includes a second outer ring and a second inner ring; and the preload generator displaces one of the first outer ring and the first inner ring relative to a respective one of the second outer and the second inner ring.

In another refinement, the preload generator includes a spring operative to displace the one of the first outer ring and the first inner ring.

In yet another refinement, the spring is a coil spring.

In yet still another refinement, the high speed rolling element bearing system further comprises a spacer that axially positions the one of the first outer ring and the first inner ring relative to the respective one of the second outer and the second inner ring, wherein the coil spring is disposed within the spacer.

In a further refinement, the spacer is a split spacer having a first half and a second half, and wherein the action of the spring separates the first half from the second half.

In a yet further refinement, the first thrust bearing and the second thrust bearing have cross-corner loading direction axial components that are in the same direction when the first thrust bearing and the second thrust bearing are reacting the primary thrust load; and wherein the cross-corner loading direction axial components are in opposite directions upon removal of the primary thrust load.

In a still further refinement, the first thrust bearing includes a first outer ring with a first outer ring groove, a first inner ring having a first inner ring groove, and a first plurality of rolling elements constrained within the first outer ring groove and the first inner ring groove and operative to transmit rotating loads between the first outer ring and the first inner ring; the second thrust bearing includes a second outer ring with a second outer ring groove, a second inner ring having a second inner ring groove, and a second plurality of rolling elements constrained within the second outer ring groove and the second inner ring groove and operative to transmit rotating loads between the second outer ring and the second inner ring; the first inner ring groove and the second inner ring groove are positioned in a fixed relationship to each other; and the preload generator displaces the first outer ring groove relative to the second outer ring groove upon the removal of the primary thrust load.

In a yet still further refinement, the first thrust bearing and the second thrust bearing are loaded against each other without the use of a third thrust bearing.

Embodiments of the present invention include a gas turbine engine, comprising: a compressor rotor system; a combustion system in fluid communication with the compressor rotor system; a turbine rotor system in fluid communication with the combustion system; means for reacting a primary thrust load, wherein the means for reacting is coupled to one or more components of one or both of the compressor rotor system and the turbine rotor system; and means for providing a thrust preload to the means for reacting upon removal of the primary thrust load.

In a refinement, the means for providing a thrust preload employs a spring to provide the thrust preload.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A high speed rolling element bearing system for reacting a primary thrust load, comprising:
    a first high speed rolling element thrust bearing;
    a second high speed rolling element thrust bearing, wherein the first high speed rolling element thrust bearing and the second high speed rolling element thrust bearing are dimensionally configured to react the primary thrust load in parallel;
    a clutch operable for selectively coupling first and second rotatable spools together, the clutch adapted to transmit the primary thrust load during a clutching operation and remove the primary thrust load upon completion of the clutching operation;
    a preload generator operative to generate a thrust preload between the first high speed rolling element thrust bearing and the second high speed rolling element thrust bearing upon removal of the primary thrust load; and
    wherein the preload generator includes a split spacer with a pair of substantially U-shaped cavities opposing one another and a spring engaged within the opposing cavities.

2. The high speed rolling element bearing system of claim 1, wherein:
    the first high speed rolling element thrust bearing includes a first outer ring and a first inner ring;
    the second high speed rolling element thrust bearing includes a second outer ring and a second inner ring; and
    wherein the preload generator displaces one of the first outer ring and the first inner ring relative to a respective one of the second outer and the second inner ring.

3. The high speed rolling element bearing system of claim 2, wherein the spring is operative to displace the one of the first outer ring and the first inner ring.

4. The high speed rolling element bearing system of claim 3, wherein the spring is a coil spring.

5. The high speed rolling element bearing system of claim 1, wherein the spacer axially positions one of the first outer ring and the first inner ring relative to the respective one of the second outer and the second inner ring.

6. The high speed rolling element bearing system of claim 5, wherein the split spacer includes a first half and a second half, and wherein an action of the spring separates the first half from the second half.

7. The high speed rolling element bearing system of claim 1, wherein:
    the first high speed rolling element thrust bearing and the second high speed rolling element thrust bearing have a cross-corner loading direction axial components that are in a same direction when the first high speed rolling element thrust bearing and the second high speed rolling element thrust bearing are reacting the primary thrust load and the primary thrust load is greater than the thrust preload; and wherein the cross-corner loading direction axial components are in opposite directions when the primary thrust load is less than the thrust preload.

8. The high speed rolling element bearing system of claim 1, wherein:
    the first high speed rolling element thrust bearing includes a first outer ring with a first outer ring groove, a first inner ring having a first inner ring groove, and a first plurality of rolling elements constrained within the first outer ring groove and the first inner ring groove and operative to transmit rotating loads between the first outer ring and the first inner ring;
    the second high speed rolling element thrust bearing includes a second outer ring with a second outer ring groove, a second inner ring having a second inner ring groove, and a second plurality of rolling elements constrained within the second outer ring groove and the second inner ring groove and operative to transmit rotating loads between the second outer ring and the second inner ring;
    the first inner ring groove and the second inner ring groove are positioned in a fixed relationship to each other; and
    wherein the preload generator displaces the first outer ring groove relative to the second outer ring groove upon the removal of the primary thrust load.

9. The high speed rolling element bearing system of claim 1, wherein the first high speed rolling element thrust bearing and the second high speed rolling element thrust bearing are loaded against each other without the use of a third high speed rolling element thrust bearing.

10. A gas turbine engine, comprising:
    a compressor rotor system;
    a combustion system in fluid communication with the compressor rotor system;
    a turbine rotor system in fluid communication with the combustion system;
    a clutch system operable for coupling first and second spools together, wherein a primary thrust load is generated during a clutching operation; and
    a high speed rolling element bearing system for reacting the primary thrust load, wherein the high speed rolling element bearing system is coupled to one or more components of one or both of the compressor rotor system and the turbine rotor system, and wherein the high speed rolling element bearing system includes:
        a first high speed rolling element thrust bearing;
        a second high speed rolling element thrust bearing,
        wherein the first high speed rolling element thrust bearing and the second high speed rolling element thrust bearing are dimensionally configured to react the primary thrust load in parallel; and
        wherein the high speed rolling element bearing system further includes a preload generator operative to load the first high speed rolling element thrust bearing and the second high speed rolling element thrust bearing against each other upon removal of the primary thrust load; and
    wherein the preload generator includes a split spacer having a pair of opposing cavities, each cavity including two side walls extending in the same direction from a back wall, and a spring positioned within the opposing cavities.

11. The gas turbine engine of claim 10, wherein:
    the first high speed rolling element thrust bearing includes a first outer ring and a first inner ring;
    the second high speed rolling element thrust bearing includes a second outer ring and a second inner ring; and
    wherein the preload generator displaces one of the first outer ring and the first inner ring relative to a respective one of the second outer and the second inner ring.

12. The gas turbine engine of claim 11, wherein the spring is operative to displace the one of the first outer ring and the first inner ring.

13. The gas turbine engine of claim 12, wherein the spring is a coil spring.

14. The gas turbine engine of claim 12, wherein the split spacer axially positions one of the first outer ring and the first inner ring relative to the respective one of the second outer and the second inner ring.

15. The gas turbine engine of claim 14, wherein the split spacer includes a first half and a second half, and wherein an action of the spring separates the first half from the second half.

16. The gas turbine engine of claim 10, wherein:
the first high speed rolling element thrust bearing and the second high speed rolling element thrust bearing have cross-corner loading direction axial components that are in a same direction when the first high speed rolling element thrust bearing and the second high speed rolling element thrust bearing are reacting the primary thrust load; and wherein the cross-corner loading direction axial components are in opposite directions upon removal of the primary thrust load.

17. The gas turbine engine of claim 10, wherein:
the first high speed rolling element thrust bearing includes a first outer ring with a first outer ring groove, a first inner ring having a first inner ring groove, and a first plurality of rolling elements constrained within the first outer ring groove and the first inner ring groove and operative to transmit rotating loads between the first outer ring and the first inner ring;
the second high speed rolling element thrust bearing includes a second outer ring with a second outer ring groove, a second inner ring having a second inner ring groove, and a second plurality of rolling elements constrained within the second outer ring groove and the second inner ring groove and operative to transmit rotating loads between the second outer ring and the second inner ring;
the first inner ring groove and the second inner ring groove are positioned in a fixed relationship to each other; and
wherein the preload generator displaces the first outer ring groove relative to the second outer ring groove upon the removal of the primary thrust load.

18. The gas turbine engine of claim 10, wherein the first high speed rolling element thrust bearing and the second high speed rolling element thrust bearing are loaded against each other without the use of a third high speed rolling element thrust bearing.

* * * * *